US012750142B1

(12) United States Patent
Stevens et al.

(10) Patent No.: US 12,750,142 B1
(45) Date of Patent: Sep. 29, 2026

(54) PRECISION PHOTON SYNCHRONIZATION

(71) Applicant: Massachusetts Institute of Technology, Cambridge, MA (US)

(72) Inventors: Mark Stevens, Pepperell, MA (US); Don M. Boroson, Needham, MA (US); Hemonth Rao, Bedford, MA (US); Matthew Grein, Cambridge, MA (US); Scott Hamilton, Lexington, MA (US); Neal Spellmeyer, Arlington, MA (US); Nicholas Hardy, Wellesley, MA (US); Katia Shtyrkova, Arlington, MA (US); Paul Dixon, Arlington, MA (US); Catherine Lee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 356 days.

(21) Appl. No.: 18/421,256

(22) Filed: Jan. 24, 2024

Related U.S. Application Data

(60) Provisional application No. 63/481,723, filed on Jan. 26, 2023.

(51) Int. Cl.
*H04B 10/70* (2013.01)
*H04L 7/00* (2006.01)

(52) U.S. Cl.
CPC ........... *H04B 10/70* (2013.01); *H04L 7/0075* (2013.01)

(58) Field of Classification Search
None
See application file for complete search history.

(56) References Cited

U.S. PATENT DOCUMENTS 7,639,953 B2 * 12/2009 Spillane ................. B82Y 20/00 250/225
9,270,385 B2 * 2/2016 Meyers .................. B82Y 10/00
9,954,623 B2 * 4/2018 Dailey .................... H04B 10/70
11,784,806 B2 * 10/2023 Figueroa ............ G01B 9/02017 380/278
12,212,371 B2 * 1/2025 Hosseini ................ H04B 10/70
(Continued)

OTHER PUBLICATIONS

Agnesi et al., Exploring the boundaries of quantum mechanics: advances in satellite quantum communications. Philos Trans A Math Phys Eng Sci. Jul. 13, 2018;376(2123):20170461.
(Continued)

*Primary Examiner* — Jai M Lee
(74) *Attorney, Agent, or Firm* — Nields, Lemack & Frame, LLC

(57) ABSTRACT

A central challenge to high-rate entanglement distribution is creating and maintaining precision synchronization of entanglement sources in different locations. This may be particularly challenging for long-distance satellite-based entanglement distribution for which photons should be synchronized to ~1 ps over roughly 400-2000 km distances between platforms with ~7 km/s relative motion. This present technology includes an entanglement distribution architecture and an associated distributed control technique employing quantum interference to generate a timing discriminant that is robust under lossy, fading atmospheric channels and suitable for use with today's quantum entanglement distribution technologies that can enable high rate, long distance satellite-based quantum networking.

20 Claims, 12 Drawing Sheets

(56) References Cited

U.S. PATENT DOCUMENTS

| | | | | |
|---|---|---|---|---|
| 12,287,425 B2 * | 4/2025 | Harvey | ................. | G01S 7/4065 |
| 2023/0206105 A1 * | 6/2023 | Spiropulu | .............. | G06N 10/40 |
| | | | | 706/62 |

OTHER PUBLICATIONS

Boroson et al., An Architecture for Synchronizing Photonic Bell State Measurements Across Lossy, Time-Varying Channels. OSA Quantum 2.0 Conference, Sep. 2020, 2 pages.
Hamilton, Overview of NASA's National Space Quantum Laboratory Program. 70th International Astronautical Congress (IAC), Oct. 25, 2019, 14 pages.
Lu et al., Micius quantum experiments in space. Reviews of Modern Physics. Jul.-Sep. 2022;94:46 pages.
Sidhu et al., Advances in space quantum communications. IET Quantum Communications. Jun. 14, 2021;2:182-217.
Spellmeyer et al., Free-space Forwarded-pump Entanglement Source Synchronization. Quantum 2.0 Conference and Exhibition, Jun. 2022, 2 pages.
Spellmeyer et al., Precision synchronization for free-space quantum networking. SPIE Quantum West, Proceedings vol. 12446, Mar. 2023, 10 pages.
Villasenor et al., Enhanced Uplink Quantum Communication With Satellites via Downlink Channels. IEEE Transactions on Quantum Engineering. Jun. 10, 2021;2:18 pages.

* cited by examiner

TRACKING LOOP ERROR MODEL $$F(t) = F(t_0) + \frac{dF}{dt}(t-t_0) + \frac{1}{2}\frac{1d^2F}{2dt^2}(t-t_0)^2$$

$$\Delta T \sim \frac{\Delta F}{t}\ \delta T \sim \underbrace{\frac{1}{F}\frac{dF}{dt}\delta T^2}_{\text{MODEL 1 ERROR TERM}} + \underbrace{\frac{1}{2F}\frac{d^2F}{dt^2}\delta T^3}_{\text{MODEL 2 ERROR TERM}}$$

PRECISION PHOTON SYNCHRONIZATION

This application claims priority to U.S. Provisional Patent Application Ser. No. 63/481,723, filed Jan. 26, 2023, the disclosure of which is incorporated herein by reference in its entirety.

This invention was made with government support under FA8702-15-D-0001 awarded by the U.S. Air Force, and FA8702-19-F-0001 awarded by the National Reconnaissance Office. The government has certain rights in the invention.

BACKGROUND

Quantum networks reliably distribute entangled states between multiple physically separate systems for use in technology applications. Entanglement is a strong quantum correlation between multiple objects (such as photons, or memories). This strong correlation is a resource that could enable quantum applications that outperform their classical analogues. Example applications include provable security of communication or encryption keys (quantum key distribution), increased timing precision, enhanced resolution of networked sensors, and networked quantum processors.

A common entanglement distribution method is shown in FIG. 1. This distribution method uses entanglement sources (Entangled Photon Source 1 and Entangled Photon Source 2) located at two network nodes (Node A and Node C). Each entangled photon source is configured to generate pairs of photons. These entanglement sources swap entanglement through an optical Bell state measurement (OBSM) in which one photon from each pair from each entanglement source (i.e. Photon 2 and Photon 3) interacts at an intermediate node (Node B). For high fidelity, the photons entering the OBSM should overlap in spatial and temporal modes. The two network nodes (Node A and Node C) may utilize the other photon from the respective pair (Photon 1 and Photon 4) for future processing. The results of the OBSM are then relayed to these network nodes to enable the entanglement distribution.

There is an interest in using satellites in the generation, measurement and distribution of these entangled photons. There are a number of different techniques that may be used, three of which are shown in FIGS. 2A-2C. In the Dual Downlink architecture shown in FIG. 2A, the entanglement source is located on the satellite and the photonic qubits are then sent to different ground stations. Space-ground synchronization is independent for each downlink and may be achieved, for example, via the pump forwarding approach that transmits a portion of the pump beam used to create the entangled photons on the satellite to the ground where they can be used to produce user entangled photons that can interact synchronously with the downlinked entangled photons.

In contrast, the Dual Uplink architecture, shown in FIG. 2B, has an advantage in being able to use ground-based entanglement sources. The Optical Bell State measurement on the satellite entangles the remaining photons at the ground stations. However, a more complex synchronization method is used as both uplinked photons must arrive simultaneously. The Uplink/Downlink architecture shown in FIG. 2C includes one entanglement source at a first ground station. Photons are sent via a satellite-based passive relay to the second ground station. This technique does not require any space-ground synchronization, but still requires that photons produced at the second ground station source be synchronized with the photons arriving first ground station.

Because spectral and temporal overlap are required for a successful OBSM, the technical challenges depend on the entanglement source waveform. As shown in FIGS. 3A-3C, these can be categorized as wideband sources with short duration (~1 ps) with a wide spectrum (FIG. 3A), narrowband sources with long duration (~100 ns) and a narrow spectrum (FIG. 3C), or intermediate sources (FIG. 3B). Achieving good temporal overlap is a challenge for the wideband case, for which the spectrum is wide and therefore more easily matched and less affected by effects such as orbital motion. In contrast, a challenge for the narrowband case is achieving good spectral overlap since effects such as orbital motion can be large relative to the spectral width. The difficulty of the intermediate case depends on the specific technologies and timing/spectral effects.

Each of the architectures shown in FIGS. 2A-2C presents technical challenges. For example, as noted above, for the dual uplink architecture shown in FIG. 2B, synchronization of the unlinked photons is necessary for proper operation. However, there are issues associated with creating this synchronization. For example, the photons must be synchronized over roughly 400-2000 km distances with roughly 7 km/s relative motion. Thus, a system that can address these challenges would be beneficial.

SUMMARY

A central challenge to high-rate entanglement distribution is creating and maintaining precision synchronization of entanglement sources in different locations. This may be particularly challenging for long-distance satellite-based entanglement distribution for which photons should be synchronized to ~1 ps over roughly 400-2000 km distances between platforms with ~7 km/s relative motion. This present technology includes an entanglement distribution architecture and an associated distributed control technique employing quantum interference to generate a timing discriminant that is robust under lossy, fading atmospheric channels and suitable for use with today's quantum entanglement distribution technologies that can enable high rate, long distance satellite-based quantum networking.

According to one embodiment, a system for precision synchronization of photons is disclosed. The system comprises a first ground station comprising: a frequency synthesizer to create a repetition rate; a laser to receive the repetition rate and generate pulses; and an entanglement source to receive pulses and generate entangled photons; wherein the first ground station generates a first synchronization signal based on the pulses generated by the laser; a second ground station comprising: a laser to generate pulses; and an entanglement source to receive the pulses and generate entangled photons; wherein the second ground station generates a second synchronization signal based on the pulses generated by the laser; and a satellite comprising: a timing measurement apparatus to measure a phase difference between the first synchronization signal and the second synchronization signal; an optical Bell state measurement apparatus to receive one entangled photon from the first ground station and the second ground station and determine an optical Bell state; and a control loop in communication with the timing measurement apparatus and the frequency synthesizer to vary the repetition rate. In some embodiments, the control loop is at least a third order loop. In some embodiments, the timing measurement apparatus comprises a Hong-Ou-Mandel interferometer. In certain embodiments, the Hong-Ou-Mandel interferometer is used to count a number of coincidences during a predetermined time period, wherein a coincidence is defined as simultaneous arrival of photons the first synchronization signal and the second synchronization signal. In certain embodiments, the number of coincidences during the predetermined time period is used as an input to the control loop. In certain embodiments, automatic gain control is used for normalization of the Hong-Ou-Mandel interferometer to correct for changes in received signal flux. In certain embodiments, for a first range of arrival time differences, the number of coincidences during the predetermined time period varies linearly with a difference in arrival time between a photon from the first synchronization signal and a photon from the second synchronization signal. In certain embodiments, the first synchronization signal and/or the second synchronization signal is delayed so as to create the difference in arrival time between the photon from the first synchronization signal and a photon from the second synchronization signal such that the Hong-Ou-Mandel interferometer operates in the first range when the entangled photons are synchronized. In some embodiments, the control loop uses pre-compensation based on a predicted orbit of the satellite to reduce a Doppler effect from the first synchronization signal and the second synchronization signal. In some embodiments, the entangled photons and the first synchronization signal are out-of-band. In some embodiments, the entangled photons and the first synchronization signal are in-band, and the timing measurement apparatus and the optical Bell state measurement apparatus share a 50:50 beam splitter such that the entangled photons and the first synchronization signal are all incident on the 50:50 beam splitter. In some embodiments, the first synchronization signal and the second synchronization signal are divided into time slots, such that during a first set of time slots, the first ground station and the second ground station both transmit photons to the satellite, during a second set of time slots, only the first ground station transmits information and during a third set of time slots, only the second ground station transmits information.

According to another embodiment, a method for synchronizing a first entanglement source at a first ground station with a second entanglement source at a second ground station via a satellite is disclosed. The method comprises synchronizing the first entanglement source with the second entanglement source; transmitting a first qubit from the first entanglement source to the satellite; transmitting a second qubit from the second entanglement source to the satellite; and performing an optical Bell state measurement on the first qubit and the second qubit at the satellite to entangle qubits at the first entanglement source with qubits at the second entanglement source. In some embodiments, synchronizing the first entanglement source with the second entanglement source comprises: transmitting a first synchronization signal from the first ground station to the satellite; transmitting a second synchronization signal from the second ground station to the satellite; performing a timing measurement at the satellite based on the first synchronization signal and the second synchronization signal; and adjusting a repetition rate of at least one of the first entanglement source or the second entanglement source based on the timing measurement. In some embodiments, the timing measurement is performed using a Hong-Ou-Mandel interferometer. In some embodiments, the repetition rate is adjusted by a control loop of at least third order. In some embodiments, the control loop uses pre-compensation based on a predicted orbit of the satellite to reduce a Doppler effect from the first synchronization signal and the second synchronization signal. In some embodiments, the timing measurement is transmitted to at least one of the first ground station and the second ground station as a low latency digital signal.

According to another embodiment, a system for precision synchronization of photons is disclosed. The system comprises a first ground station comprising: a frequency synthesizer to create a repetition rate; a laser to receive the repetition rate and generate pulses; and an entanglement source to receive pulses and generate entangled photons; wherein the first ground station generates a first synchronization signal based on the pulses generated by the laser; and a second ground station comprising: a laser to generate pulses; and an entanglement source to receive the pulses and generate entangled photons; wherein the second ground station generates a second synchronization signal based on the pulses generated by the laser and transmits the second synchronization signal to the first ground station; wherein the first ground station further comprises: a timing measurement apparatus to measure phase difference between the first synchronization signal and the second synchronization signal; an optical Bell state measurement apparatus to receive one entangled photon from the first ground station and the second ground station and determine an optical Bell state; and a control loop in communication with the timing measurement apparatus and the frequency synthesizer to vary the repetition rate. In some embodiments, the second synchronization signal and the entangled photons are transmitted from the second ground station to a satellite and from the satellite to the first ground station.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 4:
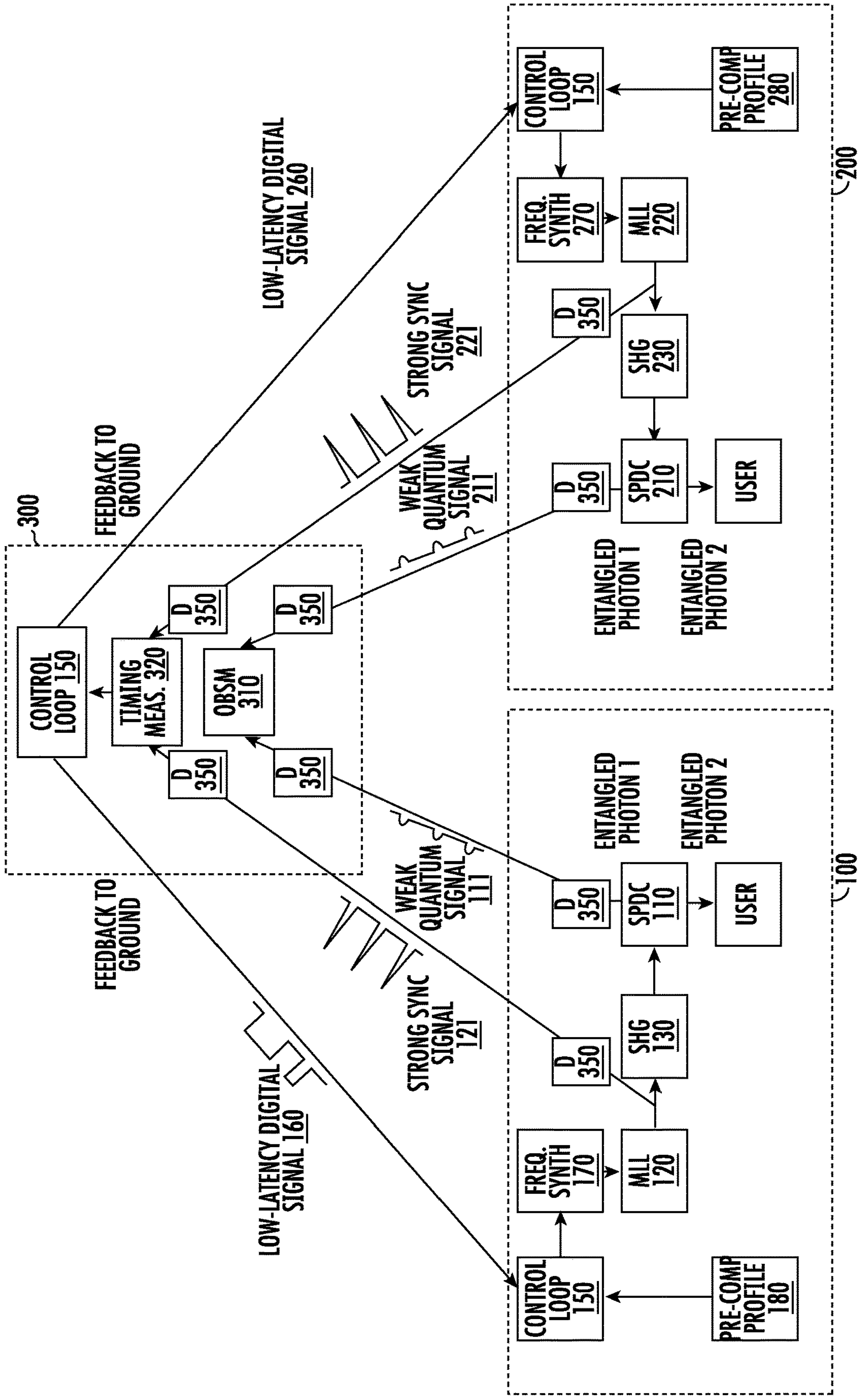
FIG. 4 shows an architecture for creating precise synchronization.

FIG. 4 shows a dual uplink architecture with enhancements to support precision synchronization.

In this architecture, there are two ground stations 100, 200 and a satellite 300. The ground stations 100, 200 may be located on earth, while the satellite 300 is in orbit. Each ground station includes a means to generate photons, which is in communication with an entanglement source, which may be spontaneous parametric down conversion (SPDC) source 110, 210. Each SPDC source 110, 210 generates pairs of photons, labelled Entangled Photon 1 and Entangled Photon 2. One of each pair of photons is transmitted to the satellite 300 as a weak quantum signal 111, 211. The second photon from each pair is used terrestrially. In FIG. 4, the second photon is shown as being directed to a user, however, the destination may differ.

The means for generating photons may be achieved in a number of ways. In the embodiment shown in FIG. 4, a mode locked laser (MLL) 120, 220 is used to generate pulses, also referred to as pump photons. The MLL 120, 220 may generate pulses at a rate of approximately 1 GHz. These pulses may enter a second harmonic generator (SHG) 130, 230, which doubles the frequency of these pulses. In another embodiment, a different device may be used to increase the frequency of the signal that enters the SPDC source 110, 210. For example, a sum frequency generator may be used. Optionally, the output from the MLL 120, 220 may be provided directly to the SPDC source 110, 210.

The SPDC source 110, 210 infrequently and randomly generates two photons for each pump photon in an injected pulse. The total energy of these two output photons is equal to the energy of the incoming pump photon. In some embodiments, one photon may be referred to as the idler photon and the second is referred to as the signal photon. Additionally, as is well known, the SPDC source 110, 210 does not create a pair of photons for each incoming pump photon in a pulse. Rather, two photons may be generated by the SPDC source 110, 210 roughly once for every $10^9$ incoming pump photons.

Entanglement occurs when two photons from these different ground stations arrive at the satellite 300 at the same time. As described above, an optical Bell State measurement apparatus 310 may be used to determine the type of entanglement.

Note that for the OBSM apparatus 310 to operate, the photons from ground stations 100, 200 must arrive simultaneously. Therefore, a control loop must be created in order to synchronize the photons from the two ground stations.

As noted above, a photon pair is generated randomly roughly once for every $10^9$ pump photons. If the pump beam is too intense, there will be a significant probability of creating multiple photon pairs during a single pump pulse slot, which will degrade the quality of the entanglement distribution. Therefore, there is a limit to the practical photon pair generation rate, typically roughly 10 MHz at the source for a 1 GHz pump pulse rate. Upon distribution over large (e.g. 20 dB) link losses, this generation rate is insufficient to create a control loop that provides adequate temporal control. Thus, each ground station 100, 200 transmits an additional higher flux synchronization signal 121, 221 to the satellite 300.

In the embodiment shown in FIG. 4, the synchronization signal 121, 221 is shown as the output of the mode locked laser 120, 220. However, other embodiments are also possible. For example, the synchronization signal 121, 221 may be the output of the second harmonic generator (SHG): 130, 230. In another embodiment, the synchronization signal 121, 221 may be derived from the mode locked laser 120, 220 or the SHG 130, 230, such as a lower frequency version of one of these signals. For example, the synchronization signal 121, 221 may be every $N^{th}$ pulse generated by the MLL 120, 220.

These synchronization signals 121, 221 are provided to a timing measurement apparatus 320 disposed in the satellite 300. As will be described in more detail below, the timing measurement apparatus 320 measures the difference in arrival time between pulses from the two synchronization signals 121, 221. The difference is referred to as the phase difference, and is used as the input to the control loop 150.

The synchronization signals may be provided as in-band signals at the same wavelength as the entangled photons, or out-of-band at a different wavelength. The option used will depend on many considerations regarding the system architecture and the specific technologies. The out-of-band option may allow more flexibility in the transmitter for the generation of the entangled photons and the synchronization photons. For the in-band option, all photons experience the same channel effects (e.g., dispersion). At the satellite, the out-of-band option permits the use of techniques such as wavelength separation to direct the entangled photons and the synchronization photons to separate processing functions, while the in-band option facilitates the use of a common HOM receiver as described elsewhere.

Note that FIG. 4 shows the control loop 150 being disposed in the satellite 300 and in both ground stations 100, 200. However, other embodiments are also possible. For example, the satellite may simply provide the phase error to the ground stations 100, 200 via a low latency digital signal 160, 260, and the control loop 150 may be implemented entirely by the ground stations 100, 200. In another embodiment, the output from the MLL from one ground station may be fixed, and the control loop 150 is only used to adjust the phase of the MLL in the other ground station.

The control loop 150 will be described in more detail below. The output from the control loop 150 may be used as an input to a frequency synthesizer 170, 270, that provides a reference as the input to control the repetition rate of the mode locked lasers 120, 220.

Thus, in operation, the frequency synthesizers 170, 270 provide the repetition rate to the mode locked lasers 120, 220, which generate pulses at this frequency. These pulses may pass through a device to increase their optical frequency, such as second harmonic generator 130, 230, to generate higher frequency pulses that are supplied to the SPDC source 110, 210. In addition, a signal derived from the MLL 120, 220 or the SHG 130, 230 may be provided as a high frequency synchronization signal 121, 221 to the satellite 300. The timing measurement apparatus 320 in the satellite 300 compares these incoming synchronization signals 121, 221 and generates a phase error signal. This phase error signal may then be processed by the control loop 150 to determine an appropriate correction signal. This correction signal is then passed to the frequency synthesizers 170, 270, which then in turn provide the frequency (and phase) reference to adjust the output provided from the MLL 120, 220. Because the synchronization signals 121, 221 occur at a higher frequency, such as greater than 1 MHZ, the bandwidth of the control loop is sufficient to achieve phase lock between the synchronization signals 121, 221. Because the photons (which represent the weak quantum signal 111, 211) are generated from the same pump as the synchronization signals 121, 221, these photons will arrive simultaneously at the satellite 300 if the synchronization signals 121, 221 are synchronized.

In this way, synchronization between the ground stations 100, 200 may be achieved, regardless of the rate of photon generation from the respective SPDC sources 110, 210.

The optical Bell state measurement apparatus 310, the timing measurement apparatus 320 and the control loop 150 will now be described in more detail.

Figure 5:
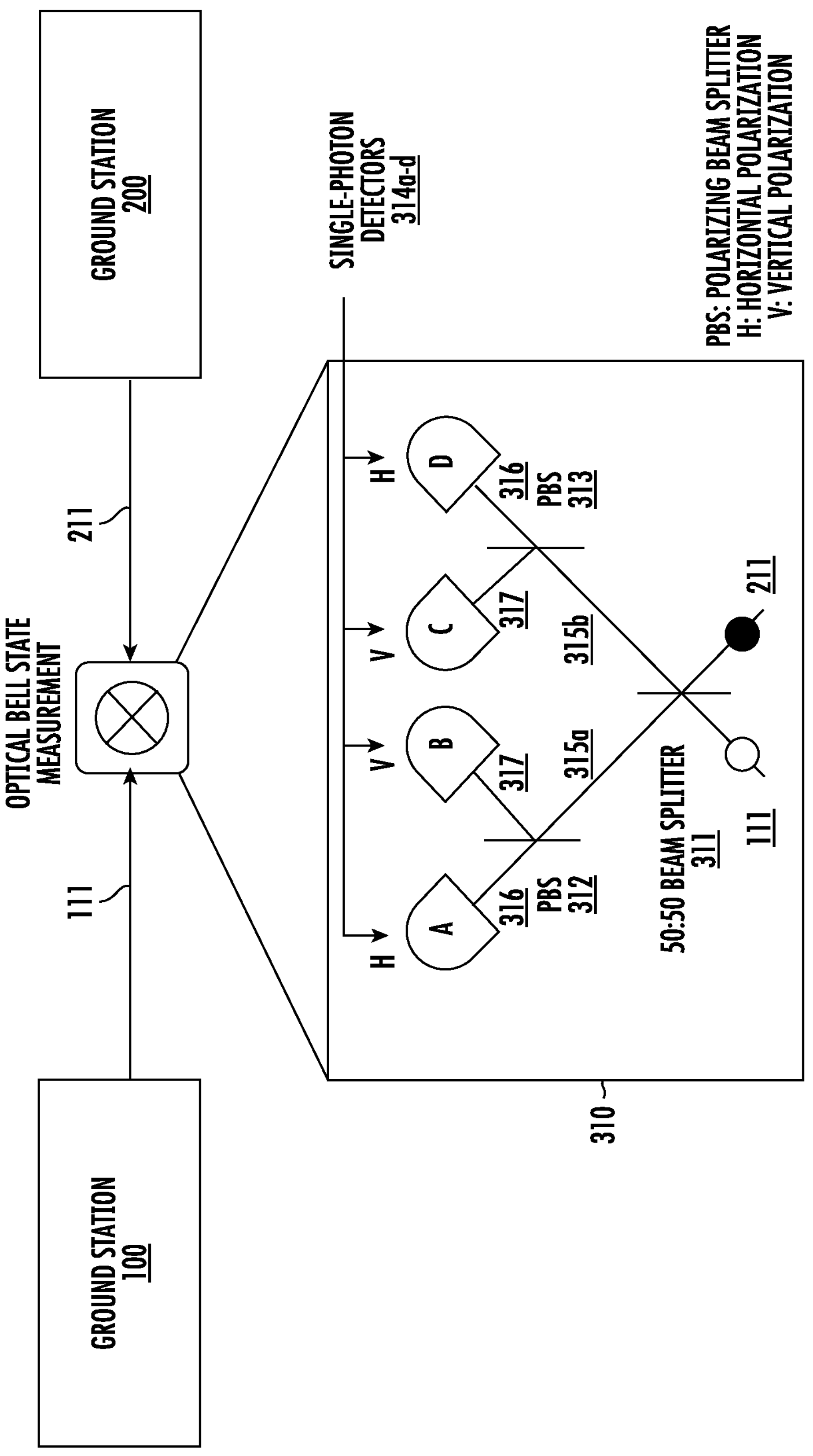
FIG. 5 shows a diagram of the optical Bell state measurement apparatus.

FIG. 5 shows an optical Bell state measurement apparatus 310 that may be employed in the present system. As shown in FIG. 4, the inputs to the OBSM apparatus 310 are the weak quantum signals 111, 211 from the ground station 100 and ground station 200, respectively. The OBSM apparatus 310 includes a 50:50 beam splitter 311. The weak quantum signals 111, 211 (which are photons) are directed toward the 50:50 beam splitter 311, and may pass through the splitter or be reflected by the splitter. Thus, the 50:50 beam splitter 311 creates two optical paths 315*a*, 315*b*. Each optical path includes a respective polarizing beam splitter 312, 313. A polarizing beam splitter allows light of one polarity to pass through the beam splitter, while light of the opposite polarity is reflected. Thus, two optical paths are created by the polarizing beam splitters 312, 313, a horizontally polarized optical path 316 and a vertically polarized optical path 317. Each of these polarized optical paths terminates at a respective single photon detector 314*a*-314*d*. Thus, based on which photon detector or pair of photon detectors are triggered, the Bell state of the photons may be determined and used to achieve the entanglement distribution across the system by transmitting this Bell state information back to the ground stations 100, 200.

Figure 6A:
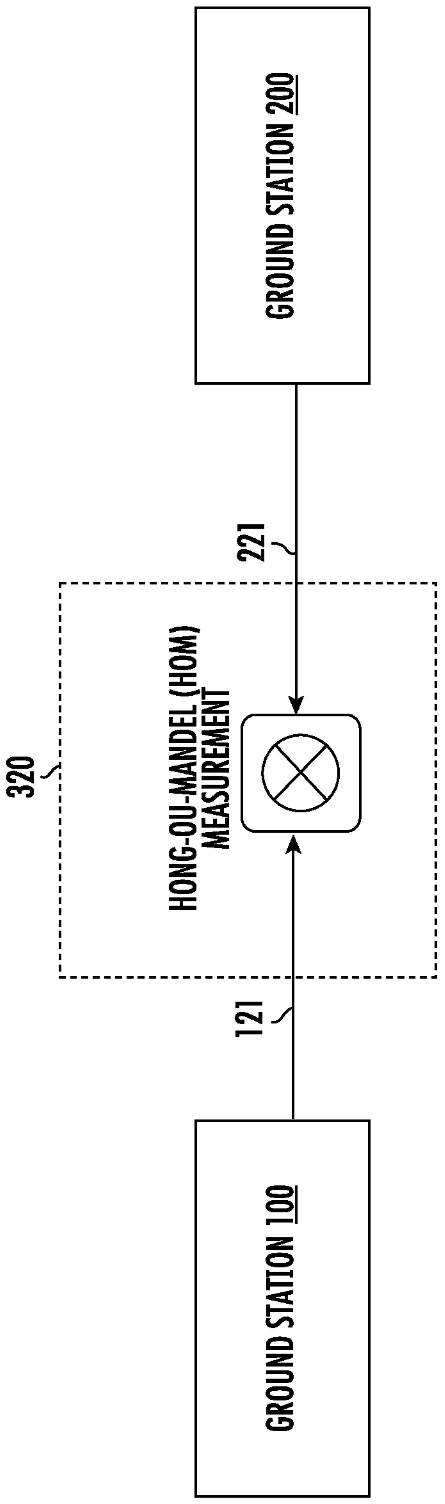
FIGS. 6A-6C show the placement, structure and operation of the timing measurement apparatus.
Figure 6B:
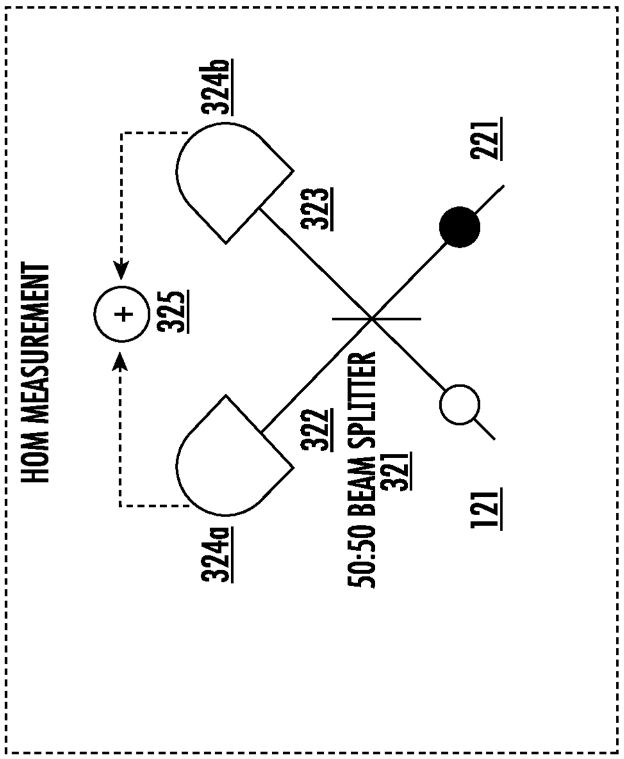
Figure 6C:
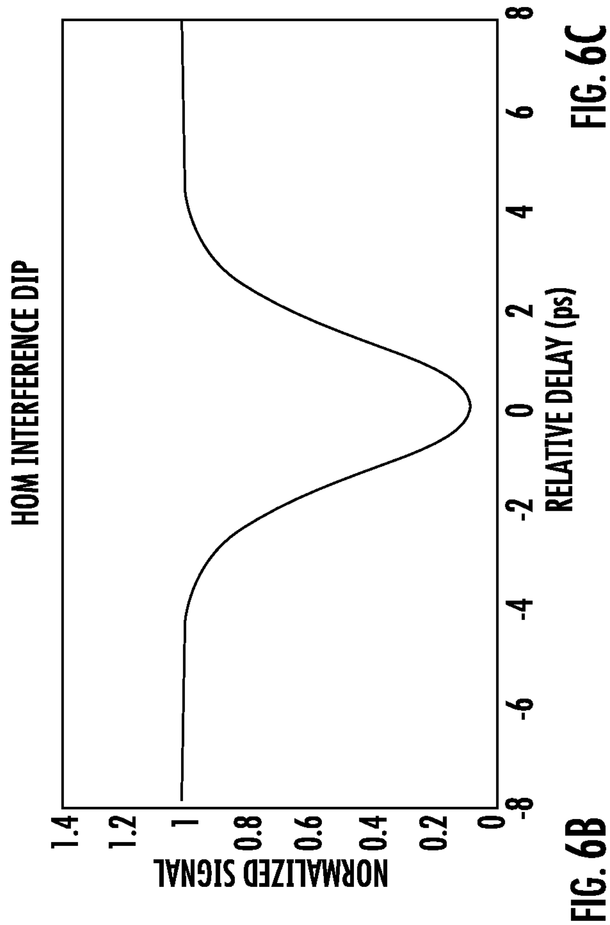

FIGS. 6A-6C shows the timing measurement apparatus 320 that may be employed in the present system. FIG. 6A shows that the timing measurement apparatus 320 is in communication with the synchronization signals 121, 221 which are generated by the ground stations 100, 200, respectively. FIG. 6B shows a block diagram of the timing measurement apparatus 320. The timing measurement apparatus 320 is a Hong-Ou-Mandel (HOM) interferometer. The HOM detector includes a 50:50 beam splitter 321. The synchronization signals 121, 221 are directed toward the 50:50 beam splitter 321. The 50:50 beam splitter 321 creates two optical paths 322, 323. Each of these optical paths 322, 323 terminates with a single photon detector 324*a*-*b*. The outputs from the photon detectors 324*a*-*b* are then summed using summing junction 325. The output of the summing junction 325 is indicative of the difference in arrival time between the two synchronization signals 121, 221.

It is known in the art that when two identical photons arrive at a 50:50 beam splitter simultaneously, they are more likely to exit on the same side of the 50:50 beam splitter 321. Thus, both photons will enter the same photon detector, resulting in its triggering, while the other photon detector is not triggered. As the difference in the arrival time of the photons increases, the likelihood that the photons are detected at different photon detectors increases. FIG. 6C shows a graph representing the HOM interference dip. The horizontal axis represents the difference in arrival time between two photons, while the vertical axis shows the normalized output from the summing junction 325. At large differences in arrival time, the photons behave independently and randomly, with a 50% chance of being transmitted and 50% chance of reflection. Thus, at these differences in arrival time, there is a 50% chance that the photons will be detected by different detectors. As the arrival time difference grows smaller, the two photons tend to be detected at the same output from the 50:50 beam splitter. When perfectly timed, the output from the summing junction 325 reaches its minimum value, creating the dip shown in FIG. 6C.

Figure 7:
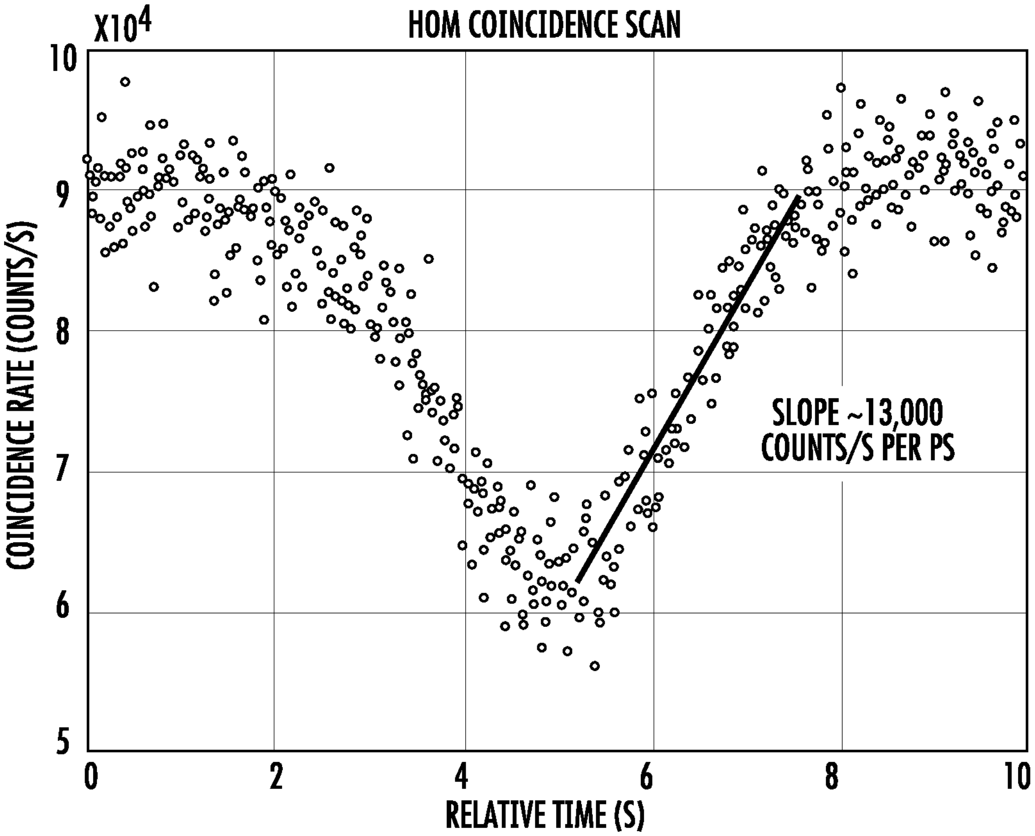
FIG. 7 shows the relationship between coincidence rate and relative delay for the timing measurement apparatus of FIG. 6B.

FIG. 7 shows this phenomenon in more detail. In this case, rather than using the normalized output from the summing junction 325, a coincidence rate is calculated. The vertical axis represents the detected coincidence rate while the horizontal axis represents time. Specifically, if the output from the summing junction 325 is indicative that both photon detectors have triggered within some coincidence window duration, this is referred to as a coincidence. In this experiment, two lasers were used to generate the synchronization signals. In the path of one of the lasers is a scanning fiber delay line, which slowly cyclically changes the delay through the fiber from 5.0 ps to −5.0 ps at a rate of 1 ps/s. Thus, as the difference between the arrival times of the two synchronization signals 121, 221 increases, the coincidence rate also increases. The coincidence rate reaches a minimum when the two signals are perfectly synchronized. The coincidence rate may be determined by counting the number of times that the output of the summing junction 325 indicated that both photon detectors were triggered over a predetermined time period. For example, the count over a predetermined period, such as 1 ms or 10 ms, may be used as an indication of the phase error between the two synchronization signals 121, 221. Note that there is a nearly linear relationship between difference in arrival time and coincidence rate as shown by line 326. This linear relationship allows the phase error to be quantified using the coincidence rate.

Note that this linear portion is offset from the point of simultaneous arrival. Thus, in one embodiment, in order to utilize this linear region, one or both of the synchronization signals are delayed. For example, as shown in FIG. 4, delays 350 may be introduced at various points in the system. Note that the delays may be disposed in either ground station 100, 200, the satellite 300, or any combination of these.

While FIG. 4 suggest that the timing measurement apparatus 320 and Optical Bell State measurement apparatus 310 are separate components, there are other embodiments. For example, the OBSM apparatus of FIG. 5 may be modified so that the vertically and horizontally polarized signals on each side of the 50:50 beam splitter 311 are summed. These two sums are then presented to the summing junction 325 (shown in FIG. 6B). This allows the timing measurement to be performed by the same apparatus that computes the Bell states. Note that this is possible if the synchronization signals and the weak quantum signals are in-band as described above.

This technique has several advantages compared with alternative methods such as comb-based or analog mixer-based techniques:

(1) The entangled photons themselves can be used for the timing measurement, allowing efficient use of photon resources;

(2) The technique is compatible with detection of in-band or out-of-band supplemental synchronization photons injected into the uplink signals;

(3) HOM interference is sensitive at time scales of the photon duration, in contrast to other interferometric techniques sensitive to single-cycle effects that are not relevant to the OBSM timing;

(4) The HOM measurement employs single-photon detectors that offer excellent sensitivity compared to other timing control methods, such as cross-comb techniques that must exceed thermal noise limits or nonlinear optical cross correlation techniques that use strong signals;

(5) Compatibility with classical HOM interference using weak coherent states, which means that a supplemental timing signal transmitted from a ground station can be sized to operate through a lossy channel; and (6) Use of photon-counting detectors for the OBSM simplifies space hardware through dual hardware use, direct compatibility with digital control loops, and the transmission of control information on a space-to-ground digital communications channel.

(7) By generating an error signal proportional to the temporal overlap of optical pulses, HOM utilizes the high bandwidth of optical frequencies (100's of THz) compared to the much lower bandwidths (few GHz) available to analog mixer-based technologies.

Having described the OBSM apparatus 310 and the timing measurement apparatus 320, a description of the control loop follows.

Among the considerations in developing synchronization control are the impact of orbital motion, available signal-to-noise ratio, necessary tracking loop bandwidth, atmospheric propagation effects, and source and platform jitter. For a dual uplink architecture, the most significant effect tends to be orbital motion, which results in rapid and large changes in line-of-sight distances. A coarse compensation mechanism is the adjustment of the entanglement source repetition rate at the source on the ground using information from a timing alignment measurement in space. Additional fine compensation can be implemented via path length delay lines that can be located on the ground and/or in space. While the focus here is on the dual uplink architecture, these techniques are applicable to other architectures, such as uplink-downlink.

Figure 8:
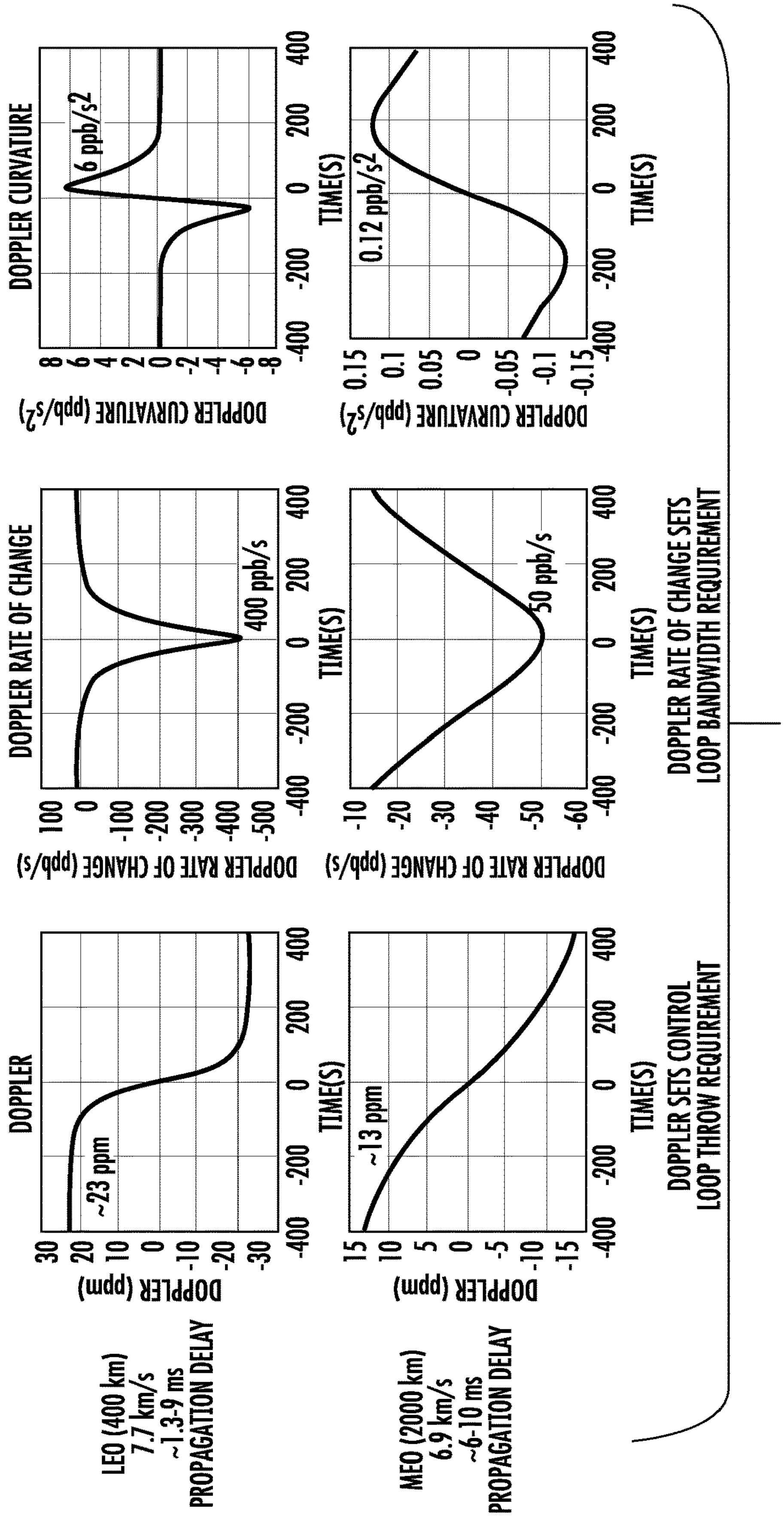
FIG. 8 depicts orbital motion for example low-earth (LEO; upper row) and medium-earth orbits (MEO; lower row)

FIG. 8 shows the effects of a moving satellite on the signals transmitted to and from the satellite. The top row represents a low earth orbit (LEO), roughly 400 km above earth and traveling at 7.7 km/s. At this orbit, the propagation time from the satellite to a ground station is between roughly 1.3 and 7 milliseconds. The leftmost graph shows the Doppler effect of the moving satellite, measured in parts per million (ppm). Note that during the transition, the rate of change of the Doppler effect in the transition region (as shown in the middle graph) is nearly constant, indicating that the signals undergo a frequency ramp. The leftmost graph determines the tuning range. Further, the Doppler rate of change (see middle graph) sets the minimum bandwidth of the control loop. The rightmost graph is the second derivation of the Doppler effect, and is referred to as the Doppler curvature.

The bottom row represents a medium earth orbit (MEO), roughly 2000 km above earth and traveling at 6.9 km/s. At this orbit, the propagation time from the satellite to a ground station is between 6 and 10 milliseconds. Note that, because the satellite is further from earth, the Doppler effect is reduced, as is the Doppler rate of change, as shown in the middle graph.

Thus, as the satellite moves and the path lengths to the two ground stations the repetition of change, rates the synchronization signals should in turn be tuned to compensate for the relative path length changes. The Doppler rate of change indicates how quickly the repetition rate should tune, and the Doppler curvature can indicate the tracking control loop residual error, depending on the control loop implementation and available signal to noise ratio. The space-to-ground propagation delay is used for determining the maximum possible feedback control loop bandwidth.

The shorter propagation time for LEO may support a faster loop bandwidth that permits better compensation for the larger (e.g., ~400 ppb/s, where ppb is a part per billion) Doppler rate of change compared to the longer propagation delay and smaller (e. g., 50 ppb/s) Doppler rate of change for the MEO case.

Figure 9A:
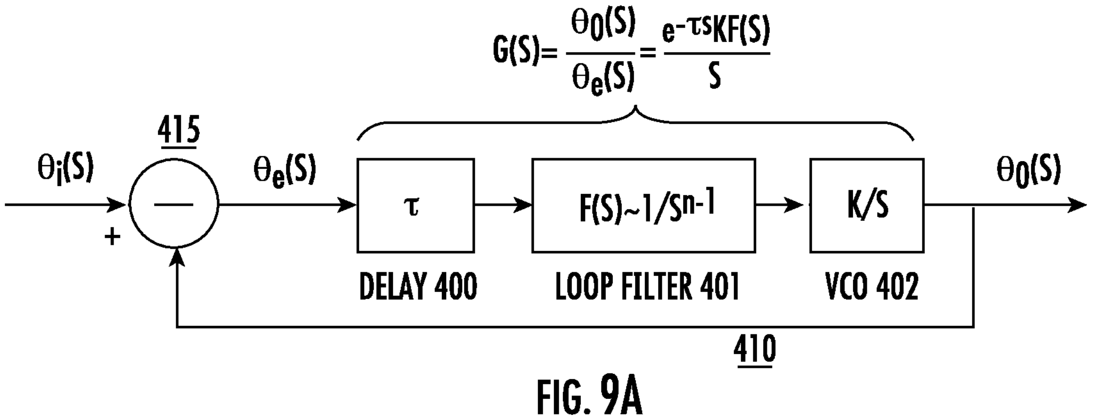
FIG. 9A shows the structure of the control loop.

In this system, the control loop 150, which may be a phase locked loop, tracks phase error. FIG. 9A shows the structure of the control loop 150. The control loop 150 includes an input, $\theta_i(s)$, an error signal $\theta_e$ (s), a propagation delay 400, a loop filter 401, a voltage-controlled oscillator 402, a feedback branch 410 and a summing junction 415. The goal of the control loop 150 is to minimize the phase error Oe(s), and preferably eliminate any steady state phase error.

The open loop transfer function is given by:

$$G(s)=\frac{\theta_o}{\theta_e}=\frac{e^{-\tau s}kF(s)}{s}$$

Note that solving for the phase error yields:

$$\theta_e=\frac{1}{1+G(s)}\theta_i$$

To eliminate any steady state phase error, $\theta_e$ must have no poles at s=0.

Figure 9B:
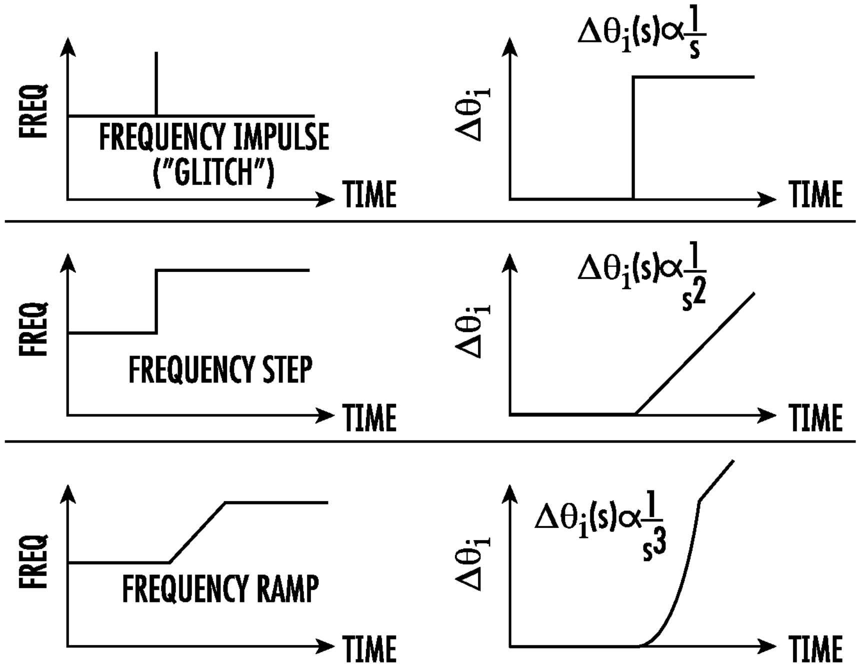
FIG. 9B shows the various types of frequency changes with the corresponding phase change.

FIG. 9B shows various relationships between frequency and phase. Note in the left graph on the top row of FIG. 9B, a glitch in frequency is detected. This corresponds to a step in phase, as shown on the right. In the frequency domain, this phase step corresponds to a 1/s function. In the middle row, a step in frequency corresponds to a ramp in phase. In the frequency domain, this phase ramp corresponds to a $1/s^2$ function. Finally on the lower row, a frequency ramp is shown. Note that FIG. 8 shows that the signals typically experience this type of frequency ramp. A frequency ramp corresponds to a phase relationship that maps to a $1/s^3$ function.

Referring to the equation for phase error above, to eliminate any steady state phase error, the open loop transfer function G(s) must have at least as many poles at s=0 as the incoming phase. Thus, based on FIG. 8, it may be expected that the incoming phase varies as $1/s^3$. Based on this, the open loop transfer function G(s) must have at least three poles at s=0. Thus, in certain embodiments, the control loop 150 may be a Type-3 loop with three poles at s=0. Note that if a small residual phase error is acceptable, a Type-2 loop with two poles at s=0 may be employed.

In other words, a second-order (type-2) loop with a single-pole loop filter 401 can perfectly track a frequency step with a residual error being the derivative of the frequency, while a more complex third-order (type-3) loop with a double-pole loop filter 401 can perfectly track a frequency ramp, with a residual error being the second derivative of the frequency.

Figure 10:
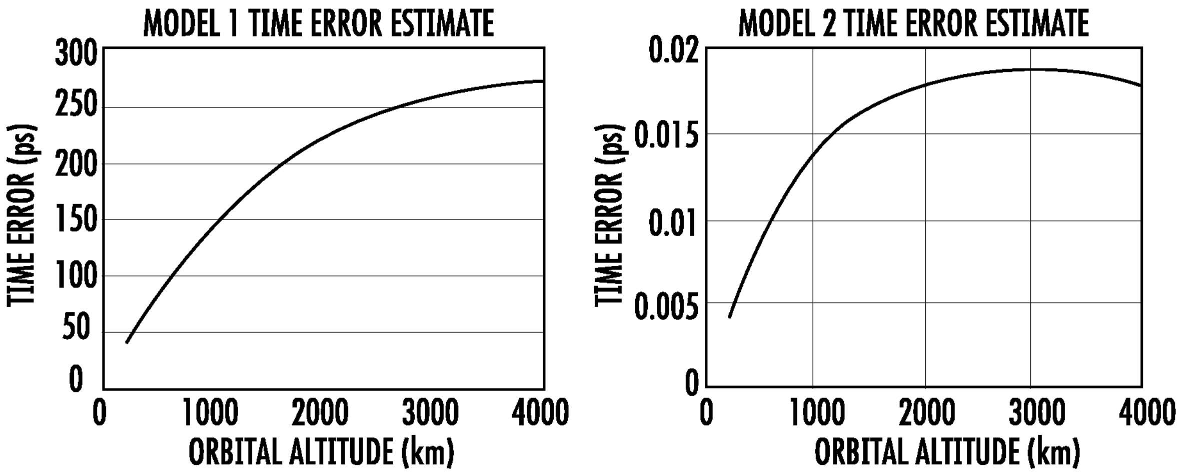
FIG. 10 shows a tracking loop model examining second- and third-order PLL errors.

FIG. 10 outlines tracking performance estimates for second- and third-order loops. It uses a discrete model in which the frequency is updated at the loop bandwidth rate, with a loop bandwidth estimated to be five space-to-ground roundtrip times. A faster loop bandwidth, e.g., approaching or greater than the roundtrip time, could lead to control loop instabilities. The error for a second-order loop ("Model 1

Error Term") is the frequency derivative, while the third-order loop error ("Model 2 Error Term") is the frequency curvature, with the assumption that the third-order loop is properly tracking the frequency slope. The resultant graphs show that a second-order loop (lower left) is insufficient for this situation, as the time error increases to well over 100 ps with increased orbital altitude. Meanwhile, the curvature error of a third-order loop (lower right) is negligible, with time errors of less than 0.02 ps.

Figure 11:
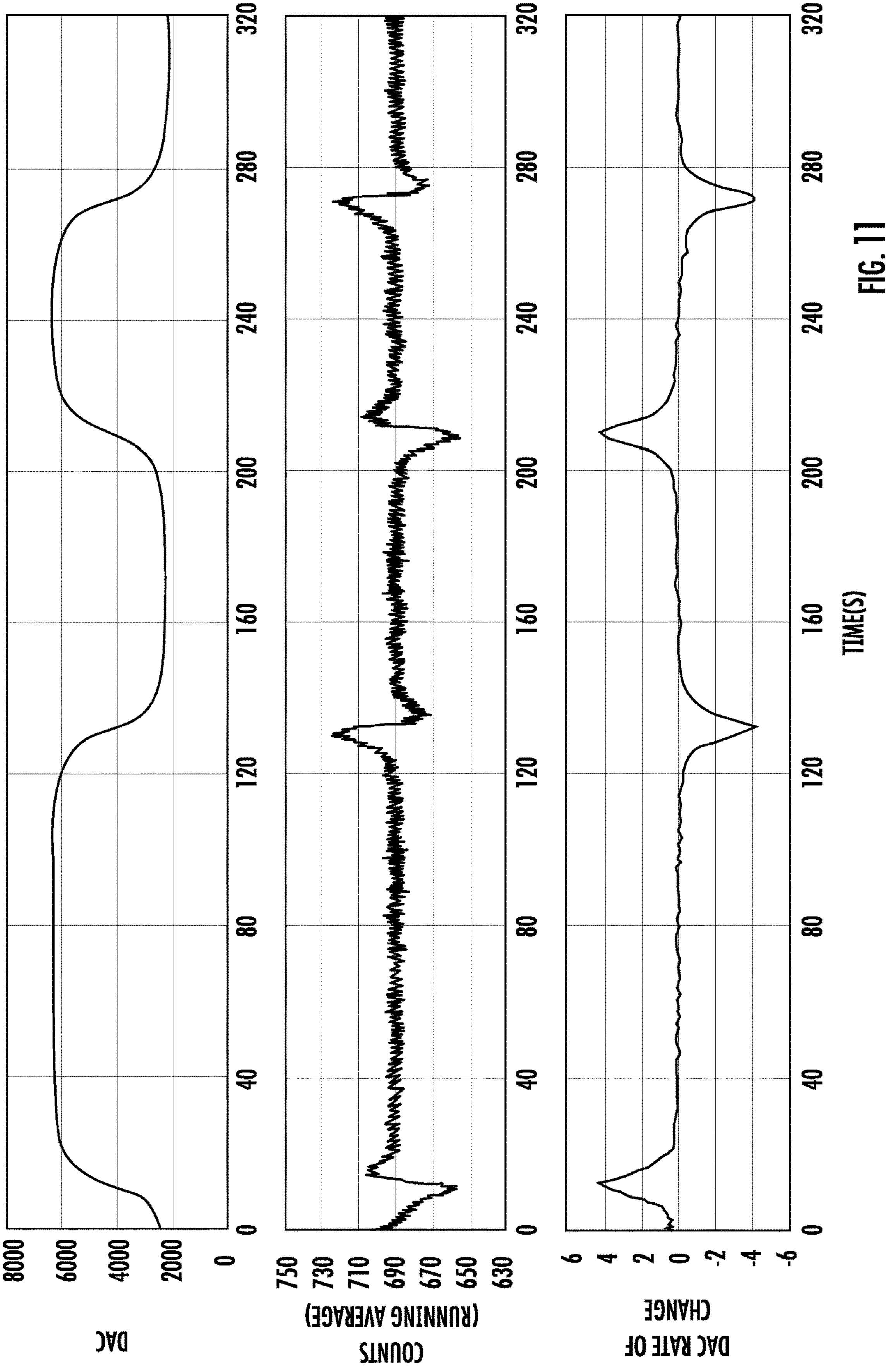
FIG. 11 shows the changes in the control signal from a Digital to Analog converter, which is applied to the frequency synthesizer due to the modeled orbital motion.

FIG. 11 shows a set of waveforms that correspond to the voltage applied to the frequency synthesizer 170, 270, the number of counts as measured by the timing measurement apparatus 320, and the rate of change of the voltage to the frequency synthesizer 170, 270. Note that due to the orbital path of the satellite, the synchronization signals experience a Doppler effect (see FIG. 8). Thus, the frequency being generated by the MLL 120, 220 must vary to track this Doppler effect. In this figure, each 1000 counts of the Digital to Analog converter corresponds to a change of 4 Hz in the frequency synthesizer 170, 270. Changes in the relative propagation times of the two ground stations 100, 200 manifest as deviations in the counts detected by the timing measurement apparatus 320. This deviation is then used to correct the frequency of the MLL 120, as seen in the top graph. Note that the frequency of the MLL 120 may change by roughly 16 Hz to compensate for these deviations.

Figure 12:
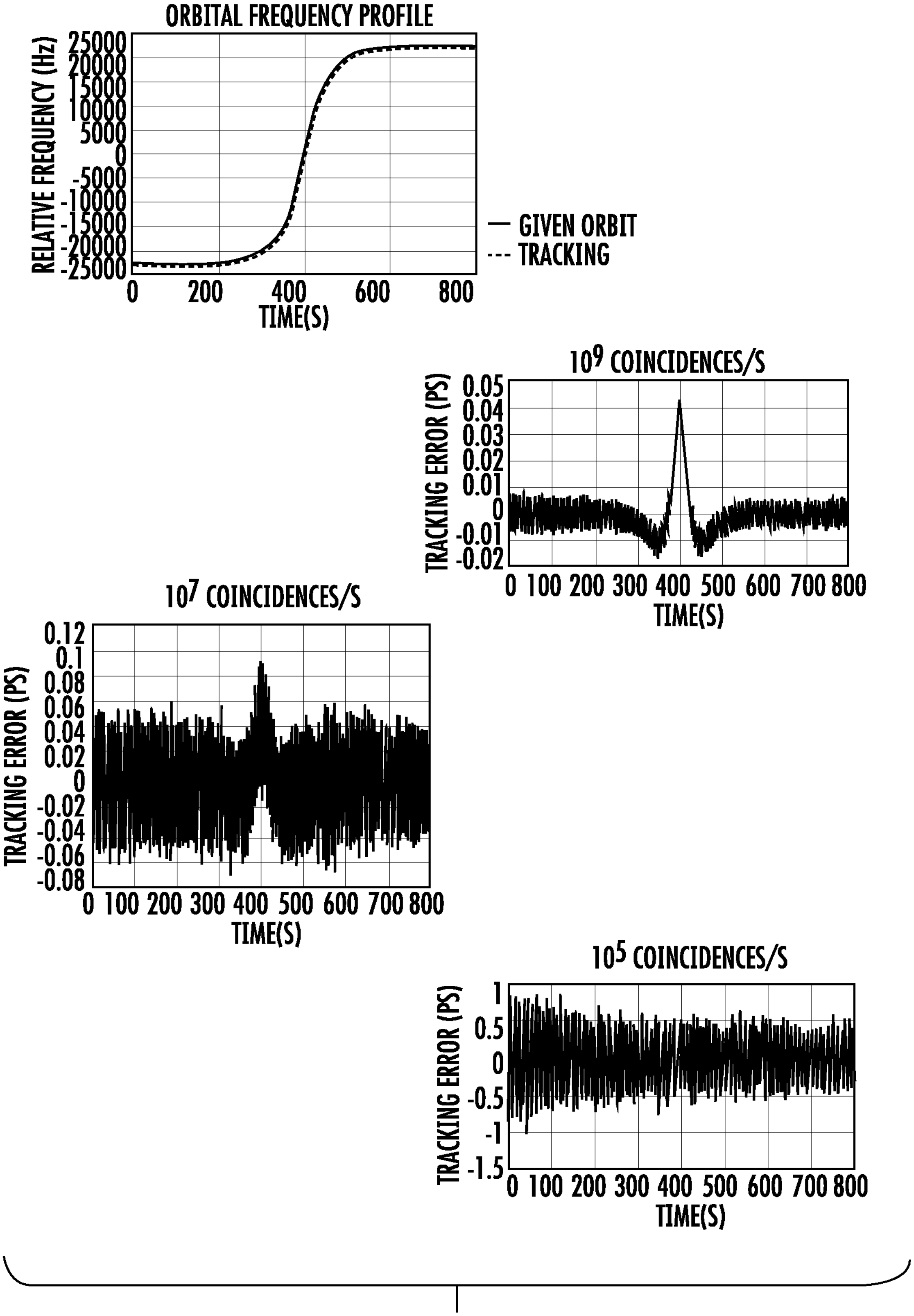
FIG. 12 illustrates a control loop model showing an estimate of the impact of signal-to-noise ratio.

Tracking performance may be affected by the available signal to noise ratio (SNR). As the number of pulses per second decreases, fewer counts lead to larger error due to statistical fluctuations that scale as the square root of the count rate. FIG. 12 illustrates the result for a simple model of a proportional-integral-derivate (PID) control loop implemented to estimate the SNR. For the orbital parameters under consideration, desired precision synchronization can be achieved with a flux generating $>10^5$ coincidences per second. This implies that, for operation over ~20 dB loss links with wideband entanglement sources that generate $\sim10^7$ photons per second, a strong supplemental synchronization signal is necessary. The inventive technology can accomplish this with strong classical signals that can function through link loss.

Atmospheric propagation introduces several considerations. The first consideration is signal fading. The amount of fading depends on many details of the link design, including aperture size, use of adaptive optics techniques, and total atmospheric path length. The impact on synchronization is twofold: a tracking loop generally should operate with a loop bandwidth slower than the typical ~1 kHz atmospheric fluctuation rate or use automatic gain control (AGC). In order to use AGC, the system should be able to accurately measure received power with an adequate bandwidth. Although the analysis here indicates that the tracking loop bandwidth is driven by the space-to-ground signaling latency, and therefore AGC control may be omitted, the photon-counting HOM readout is well suited to a fast and accurate estimate of received signal flux.

A second consideration is atmospheric timing jitter. Measurements indicate <0.1 ps jitter or times <1 s. This means that atmospheric effects are negligible for this dual uplink application. Variations occurring over longer times can be absorbed by the tracking loop itself.

A third consideration is the total change in atmospheric path length as the optical path sweeps across the atmosphere while the satellite moves through elevation. As an estimate, at 775 nm the index of fraction of air is n∞1.000275, for which the delay at zenith through a ~20 km thick atmosphere would be ~18 ns, while the delay at a 20-degree elevation would be about three times larger (~54 ns), meaning that a net delay of ~36 ns (or an equivalent additional ~10 m optical path length) should be tracked out during the slow sweep across the sky. This delay can be tracked by the synchronization control loop. This consideration is a reason that a Doppler pre-compensation approach may not be fully effective. A fine-tuning control loop based on phase detection feedback may be used instead.

Variations of the system shown in FIG. 4 are possible. For example, FIG. 4 shows that the control loop 150 may be used to adjust the repetition rate of the frequency synthesizer 170, 270 in both ground stations. However, in other embodiments, it is possible that the control loop 150 only adjusts the repetition rate on one of these devices, while the other ground station uses a fixed repetition rate. The choice of which ground station to control may be implementation dependent.

Additionally, another relevant tool is the use of pre-compensation 180, 280. Because orbits can be well predicted, the sources themselves can be predictively tuned to remove much of the relative Doppler, leaving the control loop 150 to correct for the small residual errors due to uncertainty in orbits and other effects (such as unpredictable optical path length through the atmosphere).

The present system has many features.

(1) A tunable repetition rate source that can be used to compensate for path-length changes due to satellite motion.

(2) A stable but precisely tunable reference clock (synthesizer) that the sources can be referenced to.

(3) The use of a high-flux synchronization signal multiplexed with the weak quantum signal. This signal could be at the same wavelength or a different wavelength.

(4) Slow dynamic control of the synchronization signal amplitude so that an optimal synchronization flux can be delivered through loss to the timing phase measurement. The HOM detection technique requires some optimization of the photon flux at the photon detectors 324*a*, 324*b*. At a large flux, there will almost always be coincidence counts, which can lead to a reduction in timing discriminant slope and detector saturation, while for low flux, there will be insufficient coincidence counts, leading to reduced signal-to-noise ratio. It is expected that the delivered photon flux will vary during a link duration due to channel effects, range effects, and other factors. Effects that vary more slowly than the round-trip propagation time can be controlled by measuring the photon flux from each source in some time interval at the receiver and feeding that value back to the respective ground terminal where the transmitted power can be adjusted to close a feedback control loop.

(5) A timing phase measurement relying on the HOM effect to create a timing phase discriminate. This includes an automatic gain control normalization of the discriminant to correct for changes in received signal flux.

(6) A low-latency communications channel for communicating the phase discriminant to the ground sources for feedback timing control.

(7) An optional fast but small-range path length adjustment at the receiver to correct for fast effects (such as local spacecraft jitter). As an example of their utility, there may be laser timing jitter unique to each source laser that could produce fast changes in relative timing delay of the photons arriving from the two sources. These relative delays can be measured through the HOM timing discriminant and corrected for with a low-latency correction by adjusting the path length delay 350 locally at the satellite 300. The required signal-to-noise ratio will need to increase as the local control loop bandwidth increases.

(8) A timing offset between the synchronization signal and the weak quantum signal to allow timing control on the most sensitive HOM-dip side location.

(9) The use of pre-compensation techniques to reduce the overall timing loop throw requirements.

(10) The use of an embedded photon counting communications channel to support physical layer control mechanisms (such as source-specific repetition rate control to aid acquisition). For example, the synchronization signal may be divided into time slots, where there is a first set of time slots in which both ground stations 100, 200, transmit photons that are used for synchronization purposes. There may be a second set of time slots dedicated to the ground station 100 and a third set of time slots dedicated to ground station 200. This allows other information to be transmitted from the ground stations 100, 200 to the satellite 300 during the second and third sets of time slots.

(11) Use of type-3 and higher-order control loops to track large Doppler rates of change and curvature in cases of time-of-flight limited feedback control.

Figure 1:
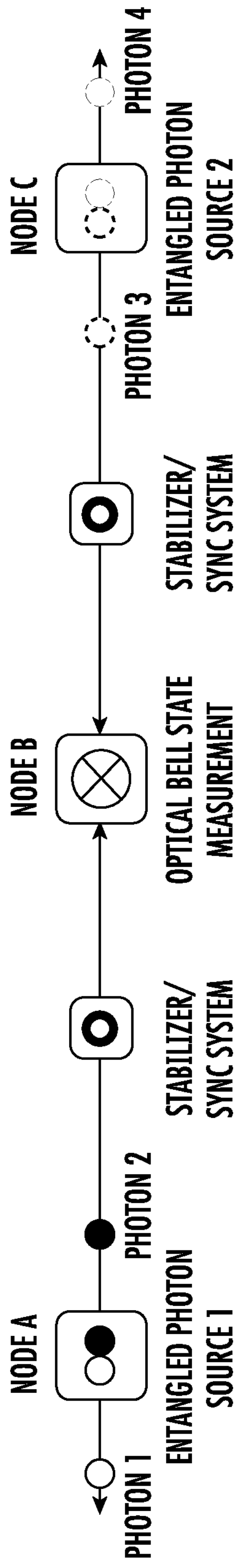
FIG. 1 shows a conventional technique for measuring and swapping entanglement using an Optical Bell State Measurement.
Figure 2A:
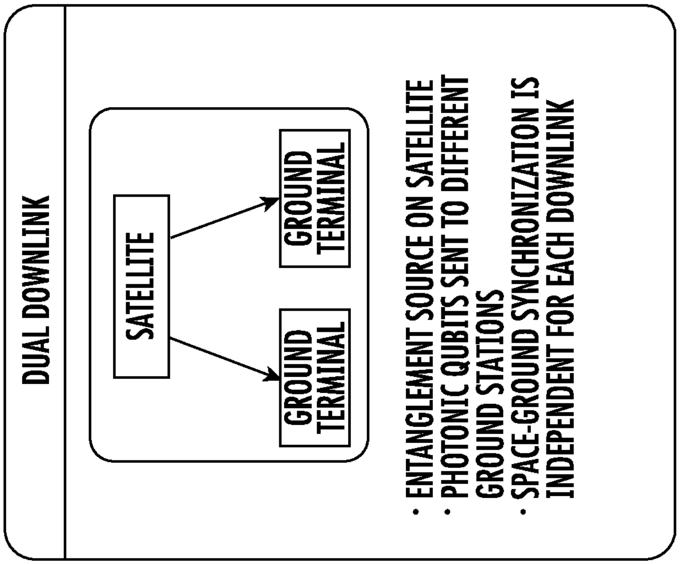
FIGS. 2A-2C show three different architectures that utilize satellites in quantum communication.
Figure 2B:
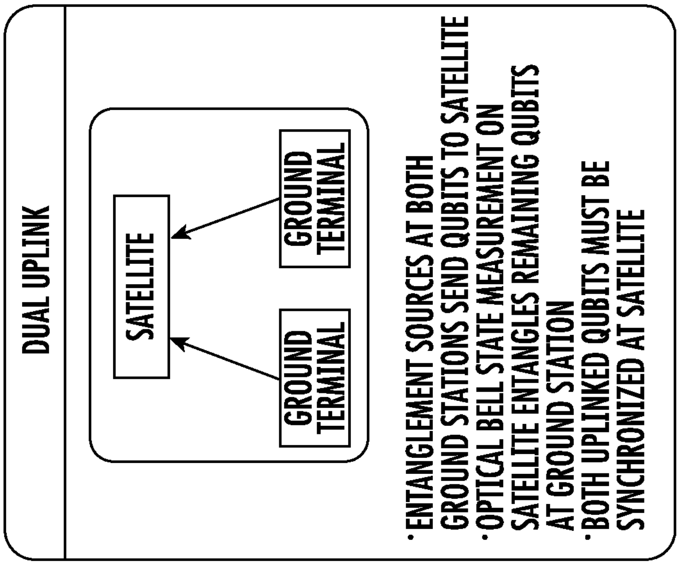

While the above disclosure discloses the use of this technique for the Dual Uplink Architecture, shown in FIG. 2B, other embodiments are also possible. For example, the functionality described as being within satellite 300 may be incorporated into the first ground station 100. In this embodiment, the first ground station 100 receives the synchronization signal 221 and the entangled photons (i.e. weak quantum signal 211) from the second ground station 200. The first ground station 100 includes the timing measurement apparatus 320 and the optical Bell state measurement apparatus 310 and is therefore able to perform the functions previously attributed to the satellite 300. Further, the control loop 150 may be incorporated entirely within the first ground station 100, such that the MLL 120 is adjusted to be synchronous with the incoming synchronization signal 221 from the second ground station 200. In this embodiment, there may be several other differences as well. For example, the synchronization signal 221 and the entangled photons may be transmitted through the air, as described above, or may be transmitted through a fiberoptic cable. Additionally, since the ground stations are fixed in position, the control loop 150 may be simplified. For example, a second order control loop may be used.

Figure 2C:
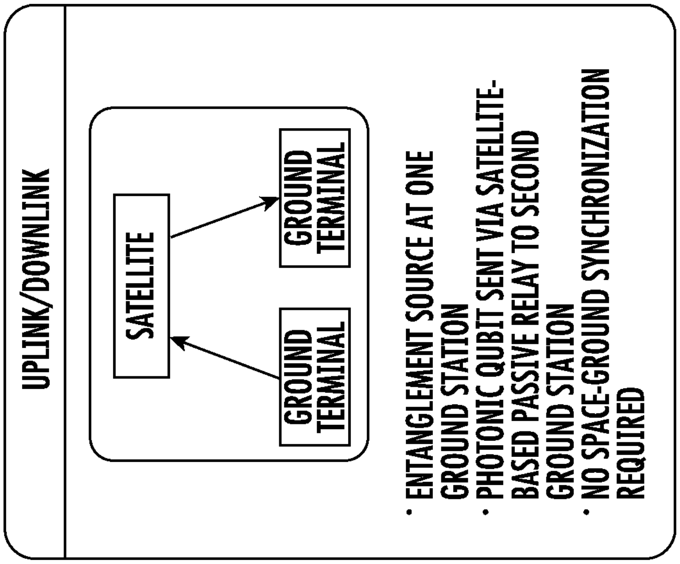
Figure 3A:
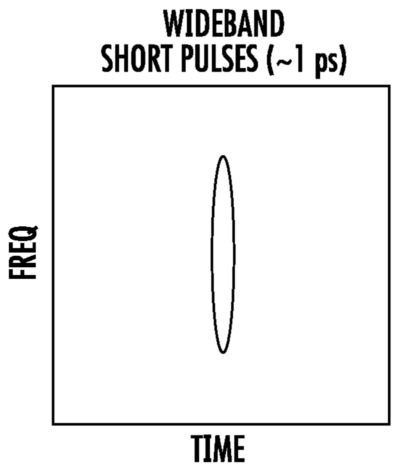
FIGS. 3A-3C show entanglement source temporal and spectral representations.
Figure 3B:
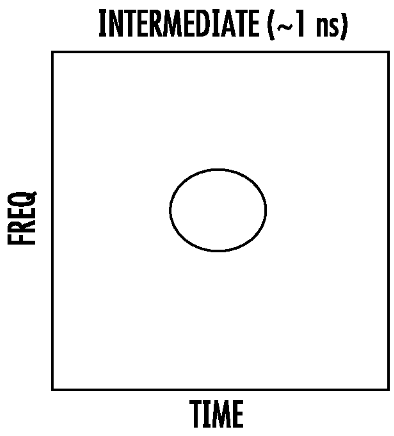
Figure 3C:
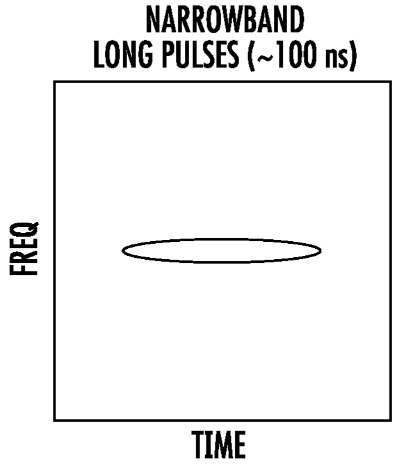

In another embodiment, the synchronization signal 221 and the entangled photons may be transmitted to the first ground station 100 through the use of a satellite, using the architecture shown in FIG. 2C.

In another embodiment, one or both of the ground stations 100, 200 may be satellites. Thus, the satellite 300 may be used to entangle photons transmitted from two other satellites or from one satellite and a station on the ground, using the techniques described herein. Thus, throughout this disclosure, the term "ground station" is also meant to encompass embodiments where the station is not located on earth.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited t the present disclosure may be beneficially implemented in any number of environments for any number of purposes. Accordingly, the claims set forth below should be construed in view of the full breadth and spirit of the present disclosure as described herein.

What is claimed is:

1. A system for precision synchronization of photons, comprising:

a first ground station comprising:

a frequency synthesizer to create a repetition rate;

a laser to receive the repetition rate and generate pulses; and an entanglement source to receive pulses and generate entangled photons;

wherein the first ground station generates a first synchronization signal based on the pulses generated by the laser;

a second ground station comprising:

a laser to generate pulses; and an entanglement source to receive the pulses and generate entangled photons;

wherein the second ground station generates a second synchronization signal based on the pulses generated by the laser; and a satellite comprising:

a timing measurement apparatus to measure a phase difference between the first synchronization signal and the second synchronization signal;

an optical Bell state measurement apparatus to receive one entangled photon from the first ground station and the second ground station and determine an optical Bell state; and a control loop in communication with the timing measurement apparatus and the frequency synthesizer to vary the repetition rate.

2. The system of claim 1, wherein the control loop is at least a third order loop.

3. The system of claim 1, wherein the timing measurement apparatus comprises a Hong-Ou-Mandel interferometer.

4. The system of claim 3, wherein the Hong-Ou-Mandel interferometer is used to count a number of coincidences during a predetermined time period, wherein a coincidence is defined as simultaneous arrival of photons from the first synchronization signal and the second synchronization signal.

5. The system of claim 4, wherein the number of coincidences during the predetermined time period is used as an input to the control loop.

6. The system of claim 5, wherein automatic gain control is used for normalization of the Hong-Ou-Mandel interferometer to correct for changes in received signal flux.

7. The system of claim 4, wherein, for a first range of arrival time differences, the number of coincidences during the predetermined time period varies linearly with a difference in arrival time between a photon from the first synchronization signal and a photon from the second synchronization signal.

8. The system of claim 7, wherein the first synchronization signal and/or the second synchronization signal is delayed so as to create the difference in arrival time between the photon from the first synchronization signal and a photon from the second synchronization signal such that the Hong-Ou-Mandel interferometer operates in the first range when the entangled photons are synchronized.

9. The system of claim 1, wherein the control loop uses pre-compensation based on a predicted orbit of the satellite to reduce a Doppler effect from the first synchronization signal and the second synchronization signal.

10. The system of claim 1, wherein the entangled photons and the first synchronization signal are out-of-band.

11. The system of claim 1, wherein the entangled photons and the first synchronization signal are in-band, and wherein the timing measurement apparatus and the optical Bell state measurement apparatus share a 50:50 beam splitter such that the entangled photons and the first synchronization signal are all incident on the 50:50 beam splitter.

12. The system of claim 1, wherein the first synchronization signal and the second synchronization signal are divided into time slots, such that during a first set of time slots, the first ground station and the second ground station both transmit photons to the satellite, during a second set of time slots, only the first ground station transmits information and during a third set of time slots, only the second ground station transmits information.

13. A method for synchronizing a first entanglement source at a first ground station with a second entanglement source at a second ground station via a satellite, the method comprising:

synchronizing the first entanglement source with the second entanglement source;

transmitting a first qubit from the first entanglement source to the satellite;

transmitting a second qubit from the second entanglement source to the satellite; and performing an optical Bell state measurement on the first qubit and the second qubit at the satellite to entangle qubits at the first entanglement source with qubits at the second entanglement source.

14. The method of claim 13, wherein synchronizing the first entanglement source with the second entanglement source comprises:

transmitting a first synchronization signal from the first ground station to the satellite;

transmitting a second synchronization signal from the second ground station to the satellite;

performing a timing measurement at the satellite based on the first synchronization signal and the second synchronization signal; and adjusting a repetition rate of at least one of the first entanglement source or the second entanglement source based on the timing measurement.

15. The method of claim 14, wherein the timing measurement is performed using a Hong-Ou-Mandel interferometer.

16. The method of claim 14, wherein the repetition rate is adjusted by a control loop of at least third order.

17. The method of claim 16, wherein the control loop uses pre-compensation based on a predicted orbit of the satellite to reduce a Doppler effect from the first synchronization signal and the second synchronization signal.

18. The method of claim 14, wherein the timing measurement is transmitted to at least one of the first ground station and the second ground station as a low latency digital signal.

19. A system for precision synchronization of photons, comprising:

a first ground station comprising:

a frequency synthesizer to create a repetition rate;

a laser to receive the repetition rate and generate pulses; and an entanglement source to receive pulses and generate entangled photons;

wherein the first ground station generates a first synchronization signal based on the pulses generated by the laser; and a second ground station comprising:

a laser to generate pulses; and an entanglement source to receive the pulses and generate entangled photons;

wherein the second ground station generates a second synchronization signal based on the pulses generated by the laser and transmits the second synchronization signal to the first ground station;

wherein the first ground station further comprises:

a timing measurement apparatus to measure a phase difference between the first synchronization signal and the second synchronization signal;

an optical Bell state measurement apparatus to receive one entangled photon from the first ground station and the second ground station and determine an optical Bell state; and a control loop in communication with the timing measurement apparatus and the frequency synthesizer to vary the repetition rate.

20. The system of claim 19, wherein the second synchronization signal and the entangled photons are transmitted from the second ground station to a satellite and from the satellite to the first ground station.

* * * * *